United States Patent [19]
Jung

[11] Patent Number: 6,154,653
[45] Date of Patent: Nov. 28, 2000

[54] SOFT SWAP HANDOFF METHOD IN A CDMA CELLULAR SYSTEM

[75] Inventor: Jin Soo Jung, Seoul, Rep. of Korea

[73] Assignee: Samsung Electronics Co., Ltd., Rep. of Korea

[21] Appl. No.: 09/087,362

[22] Filed: May 29, 1998

Related U.S. Application Data

[63] Continuation-in-part of application No. 08/965,082, Nov. 6, 1997.

[30] Foreign Application Priority Data

May 29, 1997 [KR] Rep. of Korea .................. 97-21780

[51] Int. Cl.[7] .................................................. H04Q 7/20
[52] U.S. Cl. ..................... 455/442; 455/437; 370/331; 370/332
[58] Field of Search ............................. 455/436, 437, 455/438, 442, 525; 370/331, 332, 335, 342

[56] References Cited

U.S. PATENT DOCUMENTS

| 5,428,816 | 6/1995 | Barnett et al. ............... 455/437 |
| 5,634,192 | 5/1997 | Meche et al. ................ 455/437 |
| 5,722,072 | 2/1998 | Crichton et al. ............. 455/437 |
| 5,722,073 | 2/1998 | Wallstedt et al. ............ 455/437 |
| 5,915,221 | 6/1995 | Sawyer et al. ............... 455/438 |

*Primary Examiner*—Nay Maung
*Assistant Examiner*—Quochien B. Vuong
*Attorney, Agent, or Firm*—Dilworth & Barrese

[57] ABSTRACT

A method for providing soft swap handoff in a CDMA communication system is provided. The pilot signal strengths of newly detected base stations that are above a predetermined level are compared with those of the base stations presently in active state. If the pilot signal strength of a newly detected base station is above the predetermined level and also stronger than the weakest one among those of the base stations presently in active state by a prescribed value, then the base station controller (BSC) instructs the mobile station to drop the weakest base station among the base stations that are presently in active state.

13 Claims, 6 Drawing Sheets

SOFT SWAP HANDOFF METHOD IN A CDMA CELLULAR SYSTEM

RELATED APPLICATION DATA

This application is a continuation-in-part of U.S. application Ser. No. 08/965,082 filed on Nov. 6, 1997, the disclosure therein is incorporated-by-reference herein.

FIELD OF THE INVENTION

The present invention relates to mobile communication systems, and more particularly, to a soft swap handoff method in a mobile communication system using code division multiple access (CDMA) technology.

PRIOR ART

During communication, an object of the mobile station is to remove communication obstacles while moving through a wide area. The mobile station should regularly reregister the system in the idle state when the line is not busy. The communication system is connected to the mobile station by a plurality of base stations, each of which is allocated to a particular region. Each region is managed by one base station and is called a cell.

A cell is a minimum unit of region that can be served by one base station and is composed of many sectors. This cell expands into the service region of the base station controller (BSC) which consists of base station transfer system (BTS) and in some cases, includes a mobile station center.

When a base station is working, the communication system manages the communication between the base station and the mobile station terminal controller to maintain an efficient radio Link. In CDMA and wide-band CDMA technology, one system can transmit and receive transmission signals from more than two base stations simultaneously. Thus, one terminal station controller can build up channel and transfer/receive signals with more than two base stations. These functions of a CDMA system enable the handoff from one base station to another or from one antenna region to another in a base station.

It is important to control the quality of signal and vocal information, which was transferred from many BSCs. In CDMA cellular and personal communication services (PCS) systems, various handoff methods are employed to maintain the continuity of the station. These handoff procedures differ in efficiency with respect to the credibility of a station's continuity and the load of the system according to the method being employed and content of the signal.

When handoff is required because of the mobile station's movement, at first a CDMA system maintains the continuity of call by soft handoff, which is a handoff on the same frequency from one base station to another. However, when soft handoff cannot be performed, a hard handoff is necessary to maintain the continuity of call. A hard handoff is a handoff between frequencies.

A stable handoff process is made by finding a neighboring cell that should be handed over to and by adding a supplement mechanism called a "dummy pilot" in each base station and mobile station. That is, the mobile station measures the strength of the pilot signal created from each base station, and when its strength reaches a threshold, it keeps communicating by moving to the other neighboring base station, i.e., base transceiver system.

The mobile station continues to chase or track the pilot signal, which is transferred from the base station, identifies the existence of a CDMA channel and measures the strength of the channel signal. When the mobile station detects a new pilot signal with enough strength regardless of the forward traffic channel, the mobile station and base station execute handoff.

Figure 1:
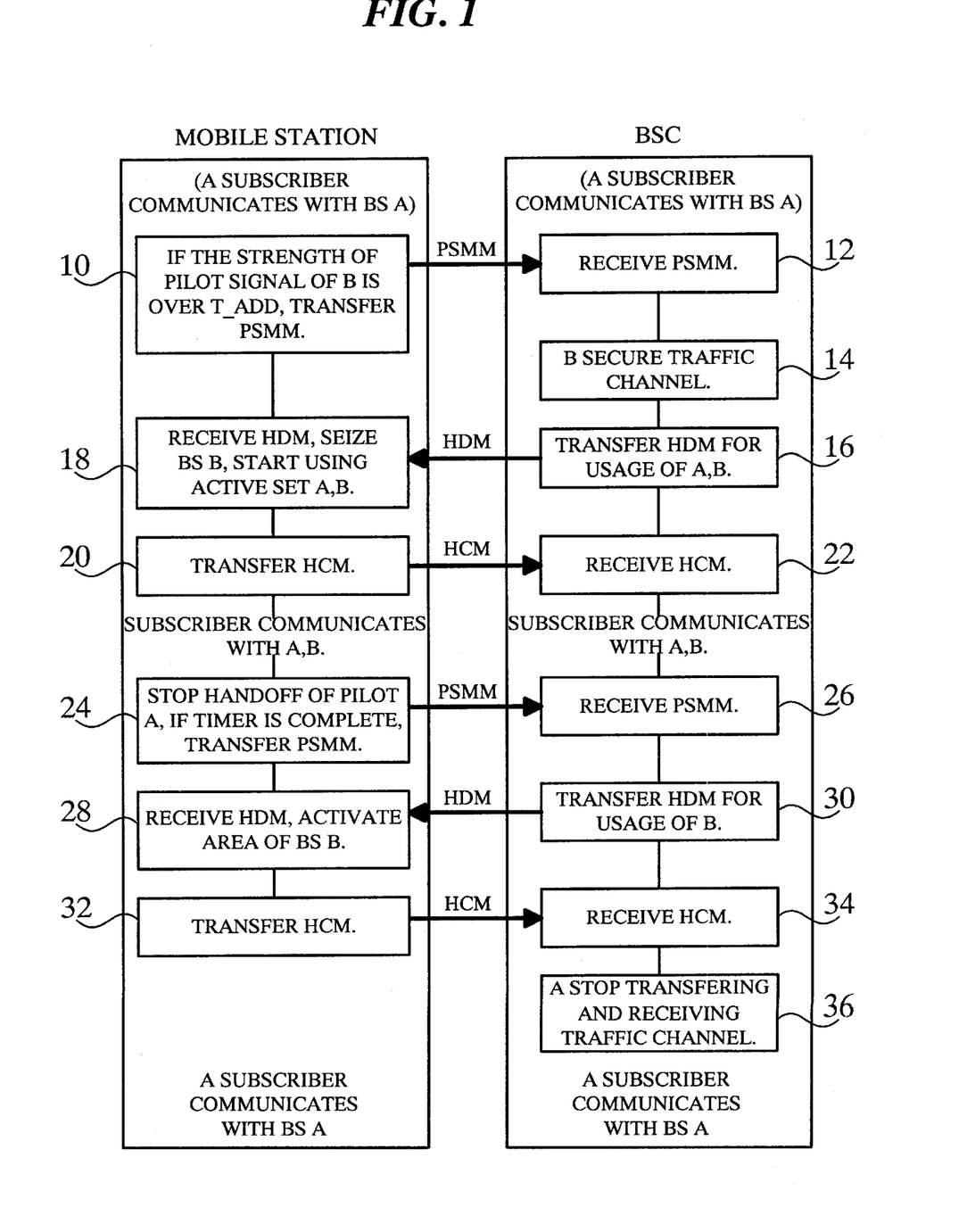
FIG. 1 illustrates a flow chart of soft handoff method executed between a mobile station and a base station.

In a CDMA system, the forward traffic channel which is transferred from the base station to the mobile station is a channel for transferring data, vocal signals power control bit and signal treatment channel data, etc. FIG. 1 illustrates the sequence of steps performed when executing handoff between a mobile station and a base station. As shown, during communication with base station (BS) A, the mobile station continuously confirms the strength of pilot signal, which is transferred from many neighboring base stations.

When the strength of neighboring base station B's pilot signal is determined to be over T_ADD (i.e., the strength necessary for establishing a channel connection with the BSC), the mobile station transmits the pilot strength measurement message (PSMM) signal to base station A (step 10). Here, ADD means that a channel is set up between the base station and the terminal station controller within the mobile station through handoff.

When base station A receives the PSMM signal through the BSC (step 12), the BSC completes preparation for soft ADD by allocating a communication channel on base station B (step 14) corresponding to the PSMM signal. After receiving the PSMM signal through the BSC, base station A starts to transmit a traffic signal and obtains an opposite direction traffic channel.

To use base station A and B, the BSC transmits a handoff direction message (HDM) to the mobile station (step 16). When communication with base station B has been established by receiving the HDM signal from BSC (step 18), the mobile station and base station B create an activated state and then transmit a handoff communication message (HCM) to the BSC (step 20). By doing this, the mobile station builds up a communication channel with base station A and B, and starts using an active set A, B. Two base stations recognize that handoff has been completed by receiving the HCM signal through BSC (step 22).

The mobile station checks the traffic packet including data and vocal information and power control bit, etc. every 20 ms, and then chooses a traffic packet which has the least cyclic redundancy checks (CRC) error. The CRC checks whether there is an error on the message by dividing the transferred message into a specific bit cyclic pattern and checks the rest.

The BSC simultaneously transfers the same traffic packet to base station A and B. When the mobile station is in the handoff ADD state with base station A and B, it keeps communicating with two base stations simultaneously. The two base stations, which are being kept in communication with each other, are called an active set. The entire process is called the soft handoff add process.

When the pilot signal strength of base station A is less than T_DROP, and this state continues during the T_DROP (timer) time while the mobile station is communicating with base stations A and B, the mobile station transmits a PSMM signal to the BSC indicating this condition on base station A (step 24). Here, "drop" means that the channel is to be removed.

After receiving the PSMM signal (step 26), the BSC transfers a HDM signal including base station B to the mobile station so that the mobile station drops base station A and uses only B (step 30). Upon receipt of the HDM signals (step 28), the mobile station informs the BSC that a channel with base station B is set up by transferring a HCM signal after deactivating base station A (step 32). When the BSC receives the HCM signal from the mobile station (step 34), it drops base station A by canceling the traffic channel allocated to base station A (step 36). This process is called the soft handoff drop process. Through this process, the mobile station moves from base station A to base station B, while maintaining stable communication.

In the soft handoff algorithm that functions as described above, the mobile station measures the strength of all the pilot signals which are transferred from neighboring base stations and informs to the BSC when any signal strength reaches the threshold values of T_ADD and T_DROP.

In CDMA systems, the BSC is programmed to enable the execution of soft handoff for up to 3 base stations (cells) simultaneously. In such system, when more than 3 base stations are present in which the strength of pilot signals are stronger than T_ADD, the previously described methods of dropping or adding cannot be executed, and the BSC doesn't perform handoff.

Figure 2:
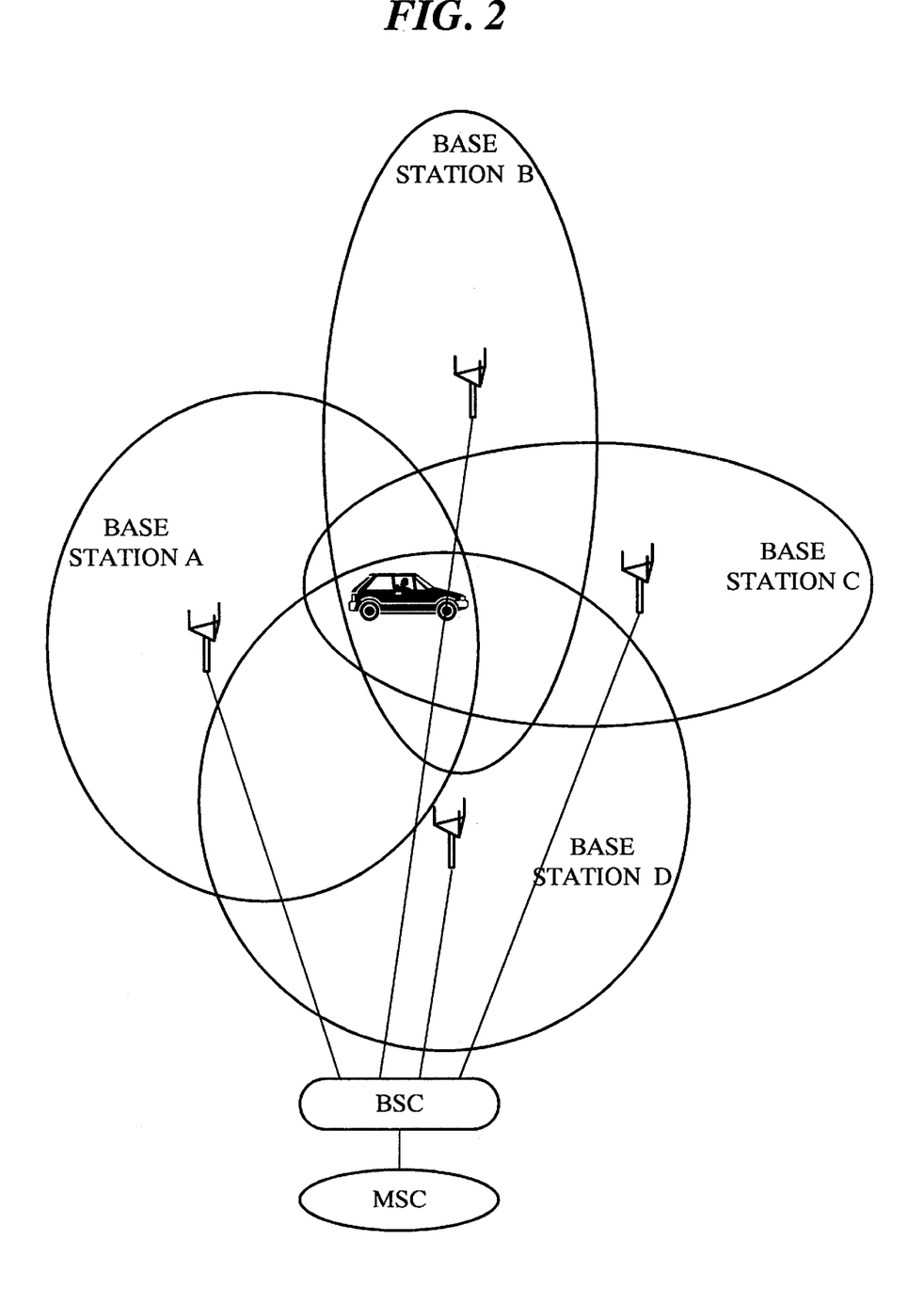
FIG. 2 illustrates a mobile station positioning in a region wherein more than 3 cells are overlapping.

FIG. 2 illustrates a transfer terminal center, i.e. a mobile terminal station, in a region where more than 3 cells are overlapping. As illustrated, a mobile terminal station, in an area having crowded radio waves, can receive radio waves from more than 3 base stations.

Figure 3:
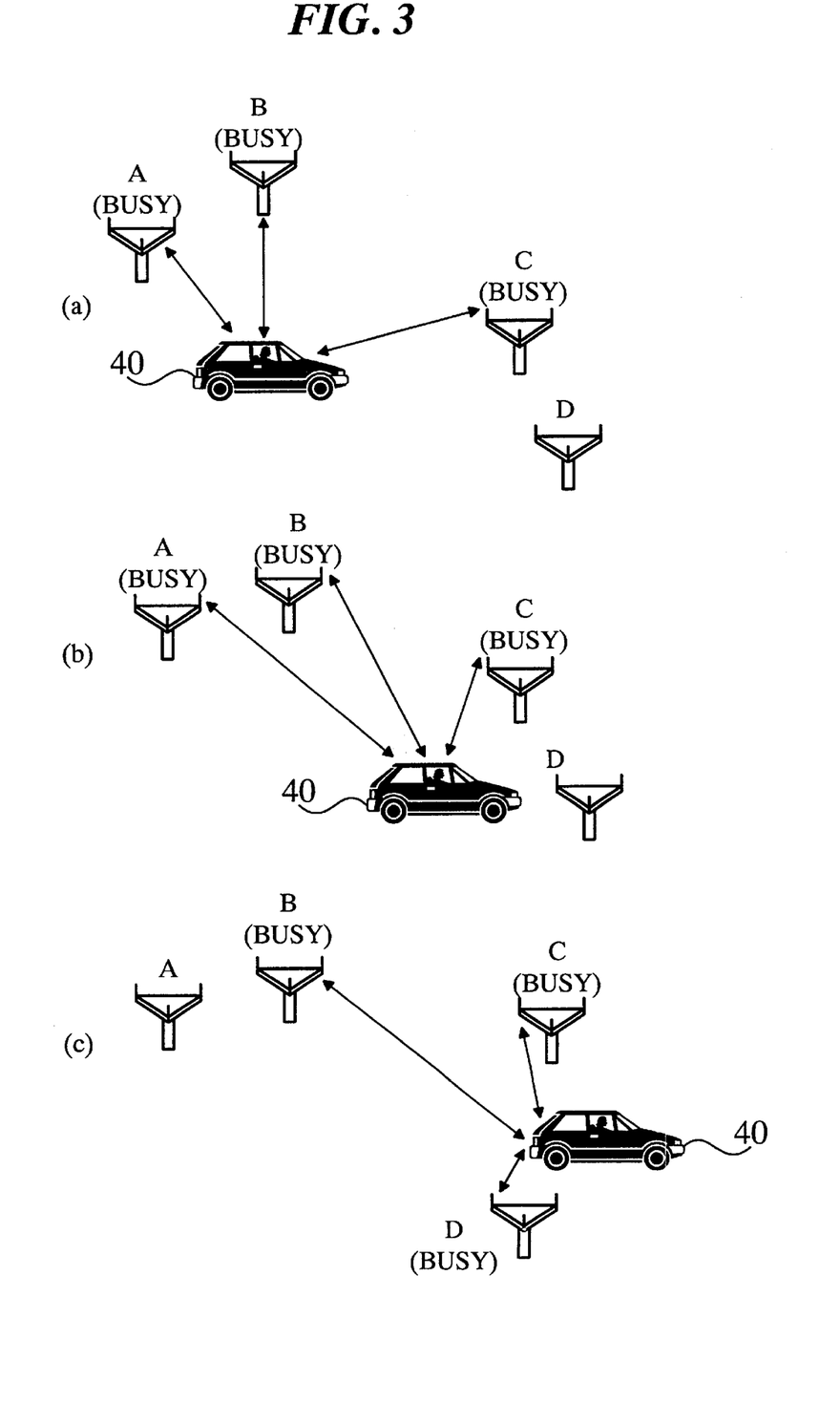
FIGS. 3a–3c illustrate processes of a handoff method for a mobile station positioning in a region wherein more than 3 cells are overlapping.

FIGS. 3a–3c illustrate handoff processes when the mobile station is in a region with more than 3 overlapping cells according to the previous described technology. Since the BSC is limited to execute soft handoff with up to 3 base stations, handoff is executed through the illustrated process.

FIG. 3(a) illustrates a mobile station 40 in the add state with base stations A, B and C. FIG. 3(b) illustrates mobile station 40 in a position where the strength of pilot signals from base station D is stronger than that of A, but base station A's signal is still stronger than the minimum critical measurement T_ADD as mobile station 40 moves to the service region of base station D. Since mobile station 40 is already receiving signals from 3 base stations, it cannot execute handoff, even though the pilot strength in the candidate set is much stronger than the pilot strength of the previously activated region. In this case, the signal of the candidate set, i.e., base station D, functions as interference to other participants.

FIG. 3(c) illustrates a situation where mobile station 40 has moved more closely to the base station D region, and the pilot strength of base station D became stronger than T_ADD and the pilot strength of base station A is continuously below T_DROP for the time T_DROP (timer) and the BSC drops base station A and adds base station D.

Figure 4:
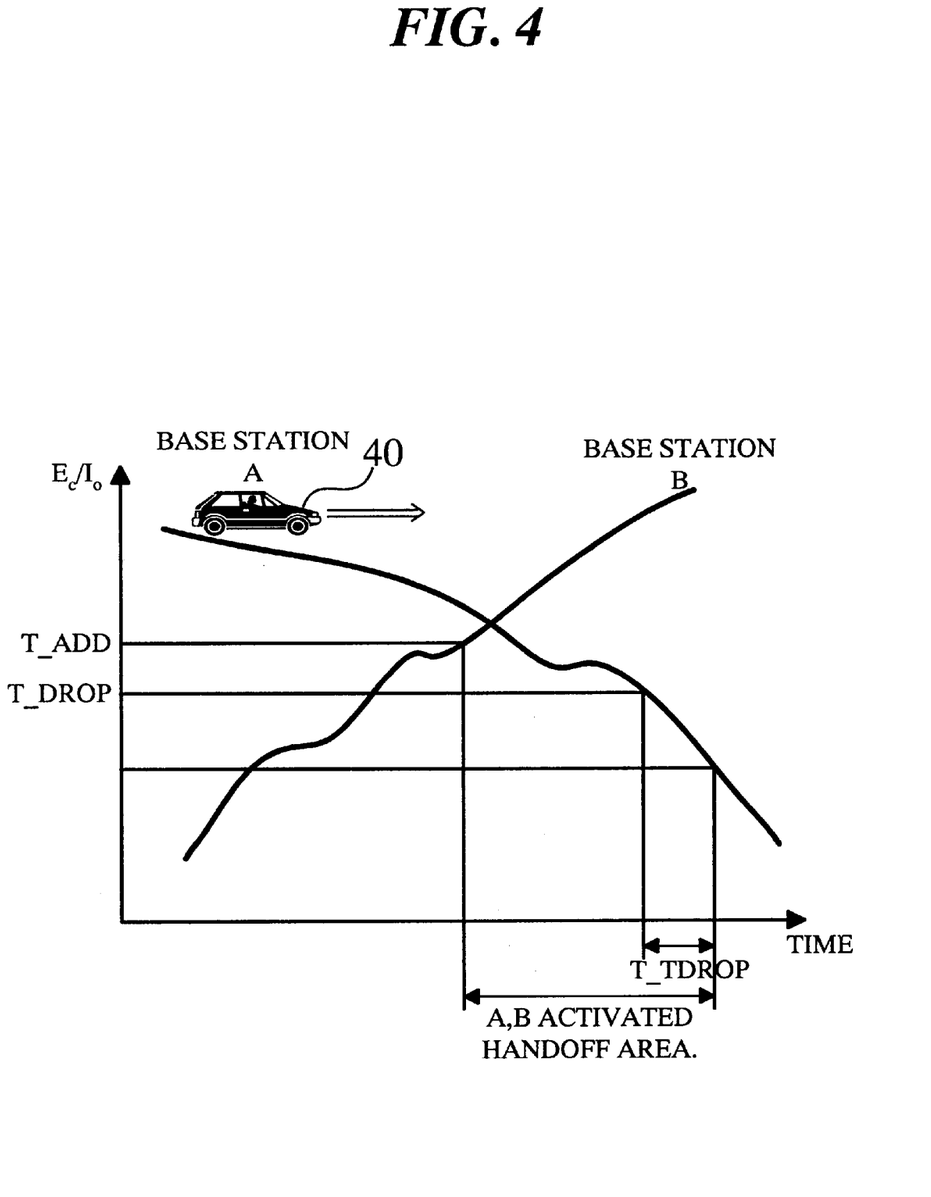
FIG. 4 illustrates a standard reference of handoff from the point of view of a mobile station.

FIG. 4 illustrates a standard handoff movement in the perspective of mobile station 40. As illustrated, when terminal 40 moves from base station A toward base station B, the signal strength of base station A decreases over time and the signal strength of base station B increases. When the signal strength of base station B gradually increases and it reaches T_ADD, handoff starts. This is the ADD process. In this state, the mobile terminal 40 is being served simultaneously by both base stations A and B. If mobile station 40 moves into the region of base station B, and the pilot signal strength of base station A decreases to T_DROP, the mobile terminal requests to drop base station A when its pilot strength is continuously below T_DROP during the time T_TDROP. This is a "drop" process.

A base station transfer system (BTS. a cell) can execute a softer add for two sectors, i.e., channel setup is executed through soft handoff between sectors. The BSC can serve 3 base station systems. When softer handoff occurs between 2 sectors in a cell, the BTS combines 2 paths from the mobile station, and receives/transmits with the station through 2 assigned channels. The BSC assigns a port on each of the 3 BTSs and chooses the least CRC error traffic packet every 20 ms. Each BTS includes 2 sectors, thus, when softer and soft handoffs occur at the same time, 6 active sets can be allocated to a maximum.

The mobile station chooses the least error signal from the active sets, and then demodulates only 3 signals according to their arrived order among the multiple signals sent from the active set.

The mobile station cannot change the active set unless the pilot signal in the previous active set satisfies the drop condition, i.e., the pilot signal is lower than T_DROP, or the base station commands to drop. If adding fails, even though the handoff was requested when the pilot strength is T_ADD, the mobile terminal sends the pilot signal measurement message (PSMM) again after the pilot strength exceeds T_COMP.

With the aforementioned technology, handoff could not be executed in the more than 3 base station regions simultaneously. Thus, if in a region where more than 3 cells overlap, the strength of the previous 3 active sets are above T_ADD, even though the pilot signal measurement message (PSMM) is sent again and as a result of it the strength of a candidate set becomes T_ADD+COMP, the handoff request of mobile station cannot be accepted.

Therefore, the mobile station cannot execute handoff when it is already receiving signals from 3 base stations, even though the strength of the pilot signals in the candidate set is stronger than that of the previously activated set by T_COMP. Accordingly the signals of candidate set function as interference with the other participants. In other words, when the BSC cannot execute handoff for new candidates, it results in increasing interference on the target cell so long as handoff is delayed.

The number of active set handoffs per call in a mobile station should be minimized; however, additional handoffs might be necessary in a region with more than 3 inter cells.

Because pilot strength can be irregularly distributed in a congested area where the cell radius is low, handoff may occur in the center of the target cell. In this case, call cutting or degradation of communication quality may occur.

SUMMARY OF THE INVENTION

The object of the present invention is to provide a soft swap handoff method to address the above problem, which cuts call or degrades communication quality because of the irregular distribution of pilot strength in an area such as midtown Manhattan or Seoul, in which the cell radius is low.

When a mobile station detects pilot signal strength from new base stations, one preferred embodiment of a soft swap handoff method in a CDMA system according to the present invention, includes the steps of: dropping a base station with the weakest pilot signal strength among the base stations presently in active state, if there is at least a base station in the new base stations whose pilot signal strength is above a predetermined level and stronger than the weakest base station among those presently in active state by a prescribed value; and adding a base station with the strongest pilot signal strength among the dropped base station and new base stations whose pilot signal strengths are above a predetermined level to the base stations in active state after the dropping step.

In the present invention, it is preferable that the predetermined level is T_ADD. And it is preferable that the prescribed value is T_COMP and the candidates for the adding are selected among the dropped base station and new base stations whose pilot signal strength are above a predetermined level.

It is preferable that the number of candidates is 6 or more and the number of base stations in active state at a time can be 3 or more.

The method preferably further comprises a step of transmitting pilot measurement request order (PMRO) from a base station controller to mobile station, and a step of transmitting pilot strength measurement message (PSMM) from the mobile station to a base station controller.

It is preferred that the method further comprises a step of reporting by mobile station to a base station, the pilot signal strength of all detected base stations which are above predetermined levels.

Another preferred embodiment of a CDMA system using a soft swap handoff method according to the present invention comprises: a mobile station for detecting pilot signal strength of new base stations; a base station controller for receiving reports of the pilot signal strength of new base stations which are above a predetermined level from the mobile station and compares the reported pilot signal strength with those of the base stations that are presently in active state, and drops a base station with the weakest pilot signal strength among the base stations presently in active state, if the weakest pilot signal strength is weaker than the strongest one among said reported pilot signal strength; and a base station transfer system for effecting transferring of base stations.

BRIEF DESCRIPTION OF THE DRAWINGS

The invention's other purposes and merit will be clearer upon reading the following explanation in detail and referring to the following drawings.

DESCRIPTION OF PREFERRED EMBODIMENTS

A preferred embodiment of the soft swap handoff method according to the present invention maintains the best handoff condition by continuously detecting the pilot signal strength of new neighboring base stations and dropping the weakest base station among ones presently in active state and adding a new neighboring base station from the candidate set of the dropped base station and the newly detected ones whose pilot signal strength are above a predetermined level.

FIG. 5(a) illustrates when the mobile station 40 is in the adding state with cells A, B, C and the strength of cell D is still below T_ADD. FIG. 5(b) illustrates that when mobile station 40 moves into the cell D sector, the strength of cell D and the strength of its pilot signal is higher than that of cell A even though the strength of cell A is still above T_DROP. In this case, mobile station 40 drops cell A through soft swap handoff, and maintains a soft add state with cells B, C and D.

Figure 5:
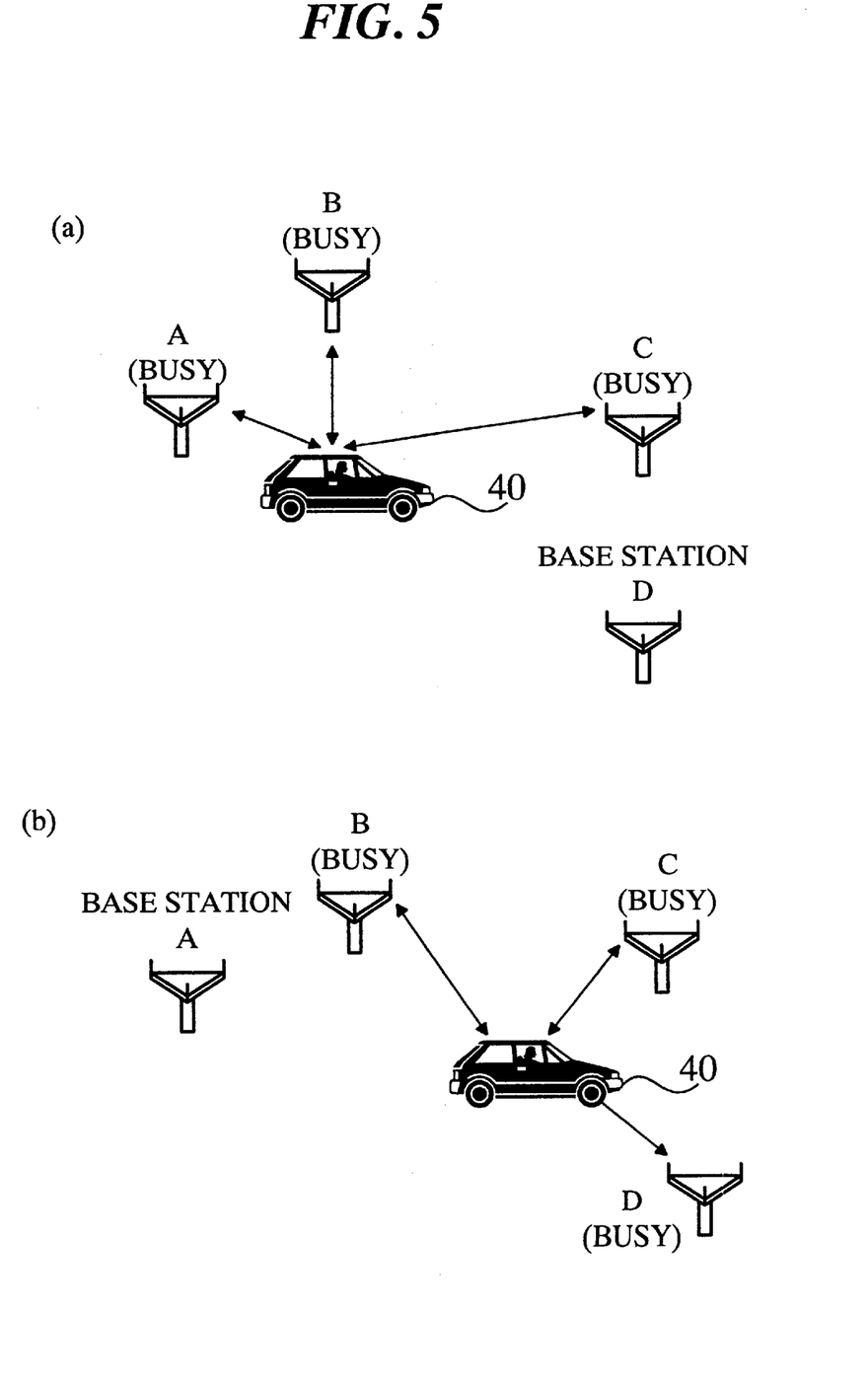
FIGS. 5a–5b illustrate processes of a handoff method for a mobile station positioning in a region wherein more than 3 cells are overlapping in accordance with the present invention.

A mobile station receives pilot signals from new neighboring base stations in a CDMA system and detects their pilot signal strengths and confirms whether there is at least a base station whose pilot signal strength is above a predetermined level, for example, above T_ADD. If so, the mobile station transfers the PSMM to the BSC (S1 of FIG. 6). In FIG. 5 base stations A, B and C are presently added and D is a newly detected base station.

Figure 6:
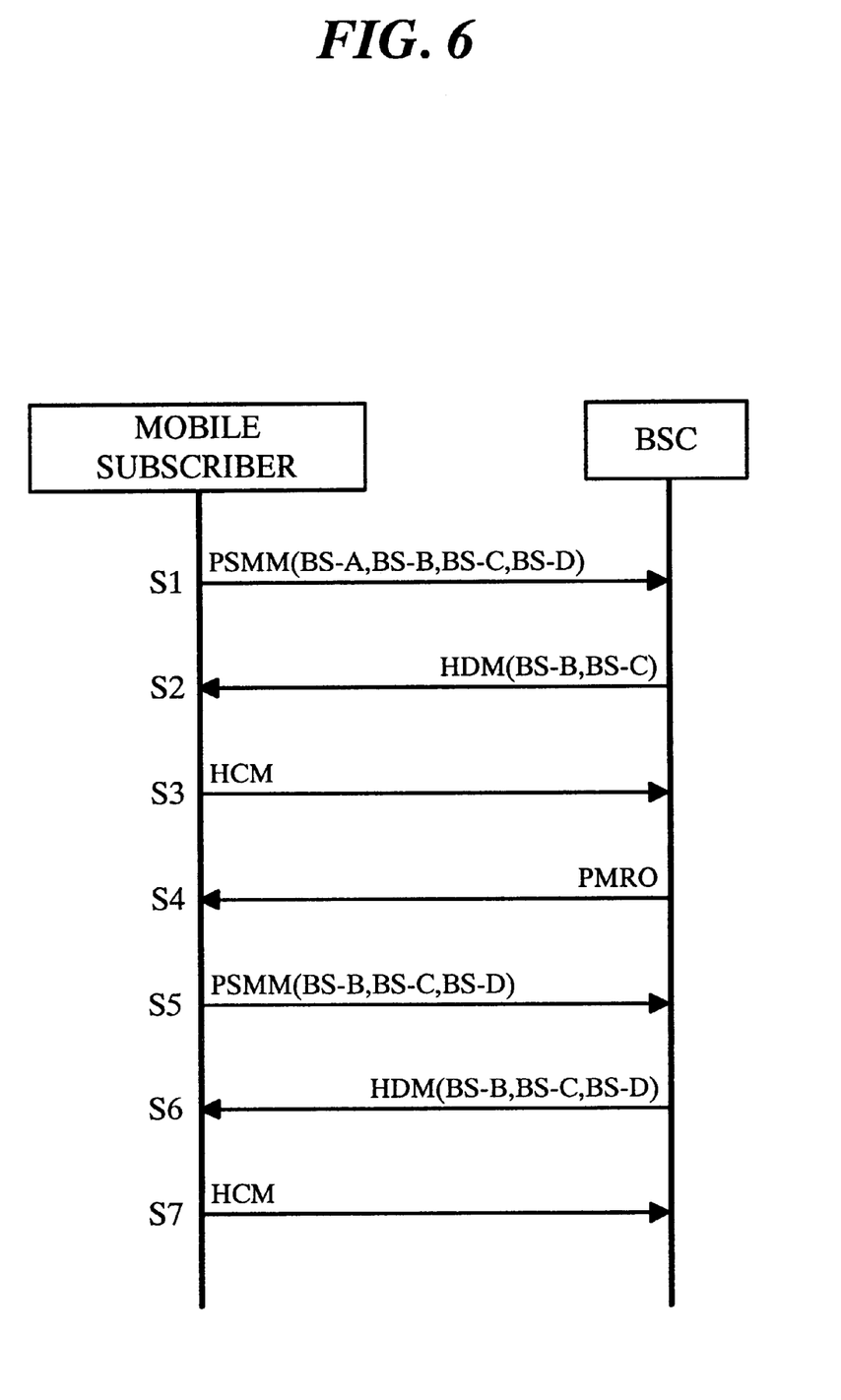
FIG. 6 illustrates procedures of a soft swap handoff method in accordance with the present invention.

If there is no base station whose pilot signal strength is larger than the predetermined level as a result of the confirmation, the base stations presently in active state are not changed. If there is at least a new neighboring base station whose pilot signal strength is stronger than a predetermined level but not stronger than the weakest pilot signal strength among those of the base stations presently in active state by a prescribed value, for example T_COMP, than the base stations presently in active state are also not changed. However if there is at least a new neighboring base station whose pilot signal strength are stronger than the predetermined level and stronger than the weakest pilot signal strength among those of the base stations presently in active state by a prescribed value, the weakest base station among the base stations presently in active state is dropped. In such case, the BSC transfers to the mobile station HDM (S2) and the mobile station responses to the BSC with HCM (S3).

The mobile station reports to a base station controller the pilot signal strength of all neighboring base stations that are above the predetermined level. For that, the BSC sends the pilot measurement request order (PMRO) to the mobile station (S4), wherein the number of all reported neighboring base stations including the dropped base station is 6 to a maximum and the mobile station responds to the BSC with PSMM (S5).

Candidates for adding are selected among the dropped base station and the new base stations whose pilot signal strength are above a predetermined level. A candidate set is made up of the dropped base station and the number of base stations in active state. Three or more such active base stations may be present.

The mobile station adds a new base station that has the strongest pilot signal strength among the candidate set pursuant to the instruction of the BSC. For that, the BSC sends HDM to the mobile station (S6) and the mobile station responds to the BSC with HCM (S7).

According to the steps S6 and S7, a cell D is newly added and according to above-mentioned steps S1–S7, a soft swap handoff is executed.

As explained previously, soft swap handoff executes T_DROP and T_ADD repeatedly. The illustrative soft swap handoff method of the present invention maintains optimal handoff conditions by choosing and adding a cell with the optimal pilot signal strength in the area where frequencies are overlapping. The quick soft handoff using the cells with the best pilot signal strength reduces the interference or inter-prevention on neighboring cells.

By reducing the number of soft handoffs performed, the system load can be decreased and as a result, the probability of occurrence of handoffs in the middle of the target cell decreases, and the probability of success in handoff and the communication quality increase.

A base station transfer system (not shown) is preferably connected to the BSC for effecting the transfer of base stations. Transfer schemes and methods known in the art can be employed.

While the invention is susceptible to various modification and alternative forms, specific embodiments thereof have been shown by way of example in the drawings and described in detail. It should be understood, however, that it is not intended to limit the invention to the particular forms disclosed, but on the contrary, the intention is to cover all modification, equivalents, and alternatives falling within the spirit and scope of the invention as defined by the appended claims.

We claim:

1. A method for soft swap handoff in a CDMA system wherein a mobile station maintains communications with one or more base stations, and a base, station in communication with the mobile station is in an active state, the method comprising the steps of:

detecting, by a mobile station, pilot signal strength of all neighboring base stations;

dropping a base station with the weakest pilot signal strength among the base stations presently in the active state, if
   (i) there is at least one base station among said neighboring base stations having a pilot signal strength greater than a predetermined level, and
   (ii) said at least one neighboring base station has a pilot signal strength greater than the pilot signal strength of the weakest base station among those presently in the active state by a prescribed value; and adding a base station with the strongest pilot signal strength among a set of candidates, said set of candidates including said dropped base station and said neighboring base stations whose pilot signal strengths are above said predetermined level and said prescribed value.

2. A soft swap handoff method as set forth in claim 1, wherein said predetermined level is T_ADD.

3. A soft swap handoff method as set forth in claim 1, wherein said prescribed value is T_COMP.

4. A soft swap handoff method system as set forth in claim 1, wherein the number of said candidates is 6 to a maximum.

5. A soft swap handoff method system as set forth in claim 1, wherein the number of base stations capable of being in active state at a time is 3 to a maximum.

6. A soft swap handoff method system as set forth in claim 1, further comprises a step of transmitting pilot measurement request order (PMRO) from a base station controller to said mobile station.

7. A soft swap handoff method system as set forth in claim 1, further comprises a step of transmitting pilot strength measurement message (PSMM) from said mobile station to a base station controller.

8. A soft swap handoff method system as set forth in claim 1, further comprises a step of reporting by said mobile station to a base station controller, the pilot signal strengths of all detected base stations which are above said predetermined level.

9. A CDMA system using a soft swap handoff method, the system comprising:

a mobile station for detecting pilot signal strengths of all neighboring base stations;

a base station controller for receiving reports from said mobile station of the pilot signal strengths of neighboring base stations which are above a predetermined level, comparing said reported pilot signal strengths with those of base stations currently communicating with said mobile station, and dropping a base station with the weakest pilot signal strength among the base stations currently communicating with said mobile station, if said weakest pilot signal strength is weaker than any of said reported pilot signal strengths by a prescribed value; and a base station transfer system, connected to said base station controller, for transferring base stations.

10. A CDMA system using a soft swap handoff method as set forth in claim 9, wherein said predetermined level is T_ADD.

11. A method for soft swap handoff in a CDMA cellular system comprising the steps of:

detecting, in a mobile station, pilot signal strengths of all neighboring base stations;

determining whether the pilot signal strength of any of said neighboring base stations is above a predetermined level (T_ADD);

sending a pilot signal measurement message (PSMM) to a base station controller (BSC) having the pilot signal strengths of the base stations above T_ADD;

comparing the pilot signal strengths of a plurality of base stations currently communicating with said mobile station with all neighboring base stations;

determining if the pilot signal strength of any neighboring base station is stronger than the weakest pilot signal strength among the plurality of base stations currently communicating with said mobile station by a predetermined amount (T_COMP); and performing handoff when a neighboring base station has a pilot signal strength stronger than the weakest pilot strength among the plurality of base stations currently communicating with said mobile station by at least the predetermined amount T_COMP.

12. The method according to claim 11, wherein said steps of performing handoff further comprising the steps of:

activating the base stations having the strongest pilot signals among the base stations; and sending a handoff direction message (HDM) to the mobile station instructing it to drop the weakest base station among the active and newly added base stations.

13. The method according to claim 12, further comprising the steps of:

sending a handoff communication message (HCM) from the mobile station to the base station controller indicating that the weakest base station among the base stations has been dropped, and that the remaining base stations have performed handoff.

* * * * *